US012559044B2

(12) United States Patent (10) Patent No.: US 12,559,044 B2
Zeng et al. (45) Date of Patent: Feb. 24, 2026

(54) PHOTOGRAPHING SYSTEM FOR ULTRALOW-HEIGHT COUNTERWEIGHT-FREE VEHICLE-MOUNTED JIB

(71) Applicant: SHENZHEN TILTA TECHNOLOGY CO., LTD., Guangming Shenzhen Guangdong (CN)

(72) Inventors: Wenping Zeng, Shenzhen (CN); Zheng Fu, Shenzhen (CN); Yaolong Luo, Shenzhen (CN)

(73) Assignee: TILTA INC., Burbank, CA (US)

( * ) Notice: Subject to any disclaimer, the term of this patent is extended or adjusted under 35 U.S.C. 154(b) by 163 days.

(21) Appl. No.: 18/285,475

(22) PCT Filed: May 9, 2022

(86) PCT No.: PCT/CN2022/091759
§ 371 (c)(1),
(2) Date: Oct. 3, 2023

(87) PCT Pub. No.: WO2022/237730
PCT Pub. Date: Nov. 17, 2022

(65) Prior Publication Data
US 2024/0181971 A1 Jun. 6, 2024

(30) Foreign Application Priority Data
May 10, 2021 (CN) .......................... 202120982923.7

(51) Int. Cl.
*B60R 11/04* (2006.01)
*B60R 11/00* (2006.01)
(Continued)

(52) U.S. Cl.
CPC .............. *B60R 11/04* (2013.01); *B66C 23/36* (2013.01); *B66C 23/66* (2013.01);
(Continued)

(58) Field of Classification Search
CPC ..................................................... B60F 11/048
See application file for complete search history.

(56) References Cited

U.S. PATENT DOCUMENTS 7,137,747 B2 * 11/2006 Chapman ............... F16M 11/42
396/428
2002/0168188 A1 * 11/2002 Fix ........................ B66F 11/048
396/419
(Continued)

FOREIGN PATENT DOCUMENTS

CN 2831187 Y 10/2006
CN 202918395 U 5/2013
(Continued)

OTHER PUBLICATIONS

International Search Report for corresponding International Patent Application No. PCT/CN2022/091759, dated Jul. 27, 2022.

*Primary Examiner* — Noam Reisner
(74) *Attorney, Agent, or Firm* — LOZA & LOZA, LLP; Derek Yeung

(57) ABSTRACT

A photographing system for an ultralow-height counterweight-free vehicle-mounted jib, comprising a base (10), a rotating part, a jib, and a damping part. The rotating part comprises a housing (1) provided above the base (10), a frame (37), counterweight blocks (36), a servo electric cylinder (35), a motor (38), a pinion (40), and a large gear (41). The servo electric cylinder (35) is connected to a rapid abutting structure (2) by means of a clamping member (43). The rapid abutting structure (2) is connected to the jib. The other end of the jib is connected to a gimbal camera mounting plate (6) by means of the damping part. The damping part comprises damping springs (8) and a universal joint structure consisting of a pitch damping rod and left and right swing damping rods. A air spring (34) is provided between the frame (37) and the clamping member (43). One
(Continued)

end of the air spring (34) is connected onto the clamping member (43), and the other end of the air spring (34) is connected onto the frame (37). A jib body is driven by the servo electric cylinder to perform a pitch motion, and the weight carried by the front end of the jib body is balanced by the air spring, so that the system is counterweight-free.

9 Claims, 8 Drawing Sheets

(51) Int. Cl.
   *B66C 23/36*          (2006.01)
   *B66C 23/66*          (2006.01)
(52) U.S. Cl.
   CPC . *B60R 2011/004* (2013.01); *B60R 2011/0075* (2013.01); *B60R 2011/0089* (2013.01)

(56)                References Cited

U.S. PATENT DOCUMENTS

| | | |
|---|---|---|
| 2012/0026467 A1 | 2/2012 | Chapman |
| 2015/0210521 A1* | 7/2015 | Valles Navarro ....... B66F 13/00 |
| | | 248/123.2 |
| 2018/0037172 A1* | 2/2018 | Nelson ............... F16M 11/2092 |

FOREIGN PATENT DOCUMENTS

| | | |
|---|---|---|
| CN | 106195549 A | 12/2016 |
| CN | 206243072 U | 6/2017 |
| CN | 212047173 U | 12/2020 |
| CN | 21470041 U | 11/2021 |
| DE | 59009085 D | 6/1995 |
| DE | 202018101488 U | 4/2018 |

* cited by examiner

37

43

43

24

23

PHOTOGRAPHING SYSTEM FOR ULTRALOW-HEIGHT COUNTERWEIGHT-FREE VEHICLE-MOUNTED JIB

TECHNICAL FIELD

The present disclosure relates to the technical field of photographic equipment, in particular to a novel car-mounted jib photography system characterized by an ultralow profile and a design devoid of counterweights.

BACKGROUND ART

Car-mounted jibs constitute significant equipment in the production of large-scale television dramas, movies, advertisements, and other major audiovisual works. Primarily employed to capture dynamic sequences like car chases, sprinting characters, and equestrian scenes from diverse angles, these jibs enable the recording of scenes even during high-speed movement. The existing technology for car-mounted cinematography jibs grapples with the ensuing challenges:

1. Exceeding 1 meter in height above the vehicle roof, thereby restricted by the shooting environment's height and susceptible to collisions with overhead goalposts.
2. Incorporating a counterweight rod extending over 1 meter behind the pitch-axis jib to balance front and rear centers of gravity. During lateral rotation of the jib, this rear counterweight rod is prone to contact with obstacles on the vehicle's side, owing to the limited width of the shooting environment.
3. Possessing a high center of gravity, which raises the risk of pronounced tilting or vehicle overturning during rapid turns.
4. Lacking a streamlined housing, resulting in elevated air resistance and noise levels.

SUMMARY OF THE INVENTION

The primary aim of the present disclosure is to tackle the aforementioned challenges by introducing a car-mounted jib photography system boasting an ultra-low profile and counterweight-free design. This system integrates servo electric cylinders and air springs, leveraging the servo electric cylinder for pitch motion of the jib and the air spring for offsetting the front-end load, thereby achieving a counterweight-free configuration.

In order to achieve the abovementioned objectives, the technical schemes provided by the present disclosure are as follows:

This disclosure offers a photographing system for an ultralow-height counterweight-free vehicle-mounted jib. The system encompasses a base, a rotating component, a jib, and a damping module. The rotating element embraces a housing, frame, counterweight block, servo electric cylinder, motor, pinion, and large gear. The servo electric cylinder connects to a rapid abutting structure through a clamping member, further linked to the jib. The other end of the jib is connected to a gimbal camera mounting plate by means of the damping part. The damping part comprises damping springs and a universal joint structure consisting of a pitch damping rod and left and right swing damping rods. An air spring is provided between the frame and the clamping member. One end of the air spring is connected onto the clamping member, and the other end of the air spring is connected onto the frame.

Utilizing the telescopic movement of the servo electric cylinder and the air spring, the clamping member is mobilized for pitch movement. The air spring provides supplementary assistance in equilibrium of the jib's load. This configuration ensures that the forces exerted by the servo electric cylinder during extension and contraction remain balanced, negating the necessity for counterweight blocks to balance the center of gravity, thereby enhancing user-friendliness. The diagonal positioning of the servo electric cylinder and air spring prevents the overall height of the device from being affected by the lengths of these components themselves, effectively reducing the device's overall height.

Moreover, the frame couples with the large gear through a rotary bearing, while the bottom of the large gear interfaces with the rotary bearing base plate via a disc. This rotary bearing base plate establishes a connection with the base, with the large gear engaging the pinion. The pinion, in turn, links to the motor's output shaft through a reducer. Both the pinion and the servo electric cylinder find placement within the frame, situated inside the housing. The servo electric cylinder attaches to the rapid abutting structure through the clamping member, itself connected to the jib. Meanwhile, the opposite jib end joins the gimbal camera mounting plate through the damping module. This damping module comprises damping springs and a universal joint structure featuring tilt and pan damping rods as well as lateral swing damping rods. Simultaneously, an air spring is located between the frame and the clamping member, with one end connecting to the clamping member and the other securing to the frame.

The damping springs appear in 2 pairs, with each pair positioned on the outer flanks of two jib bodies. On the inner sides of these jib bodies, damping rods one and two are positioned, with the inner extremities of these rods connecting to a limiting damping rod steel shaft. This limiting damping rod steel shaft's two ends attach to the inner facets of the jib bodies. Meanwhile, the outer extremities of damping rods one and two both join the damping jib square tube side plate. The inner sides of the two damping jib square tube side plates couple with the damping jib square tube, while the opposing side of the damping jib square tube connects to the upper damping plate fixing plate. This upper damping plate fixing plate links to the lower damping plate fixing plate, which subsequently interfaces with the damping jib fixed side plate. The damping jib fixed side plate connects with the jib, and the upper corner of the damping jib square tube attaches to one end of the damping spring fixing bracket through a damping jib steel shaft. The other end of the damping spring fixing bracket attaches to the jib body using an alternative damping jib steel shaft, while the lower corner of the damping jib square tube secures to the extremity of the jib body.

As for the tilt and pan damping rod, referred to as damping rod three, its outer end couples with an intermediate damping rod bracket through a tilt and pan damping rod steel shaft two. Simultaneously, its inner end links to a tilt and pan axis damping bracket via a tilt and pan damping rod steel shaft one. Both the tilt and pan axis damping bracket and the intermediate damping rod bracket are located at the jib body's front end.

Wherein the lateral swing damping rods consist of damping rods four and five. Outer ends of damping rods four and five attach to the ends of the tilt and pan axis damping bracket, while the inner ends of damping rods four and five are connected to the roll axis lower bracket. The roll axis lower bracket links to the roll axis upper bracket through a damping jib roll axis. The upper part of the roll axis upper bracket attaches to a tilt and pan axis base plate, with both sides of the tilt and pan axis base plate connected to the lower edge of the tilt and pan axis damping bracket.

Wherein the roll axis lower bracket connects to an upper damping plate fixing plate. The bottom of the upper damping plate fixing plate is connected to the upper damping plate via upper damping plate steel columns, and the upper damping plate is linked to the lower damping plate via damping steel rings. The lower damping plate is attached to the gimbal camera mounting plate through lower damping plate steel columns. Four sets of damping steel rings are employed, strategically positioned along the four edges between the upper damping plate and the lower damping plate.

The swing jib is meticulously constructed through the integration of two cross braces, three diagonal braces, three main jibs, four crossbars, six secondary jibs, and three rapid abutting structures. These components are interlinked using bolts. The swing jib is divided into three distinct parts by the presence of two rapid abutting structures. Within this configuration, two of the segments comprise a cross brace, a diagonal brace, two crossbars, two secondary jibs, and one main jib. The remaining segment, positioned in proximity to the damping part, encompasses a diagonal brace, two secondary jibs, and one main jib. The cross braces and diagonal braces are strategically situated directly above the main jib, while the two secondary jibs are symmetrically aligned on either side above the main jib. Additionally, the two crossbars symmetrically attach to the sides of the main jib utilizing steel cables.

The rapid abutting structure encompasses a main jib docking male connector and a main jib docking female connector. Each of the four corners of both the male and female connectors is equipped with corresponding threaded holes, and these connectors are also outfitted with through holes in their lower parts to facilitate the passage of the main jib.

Symmetrically positioned on both sides of the servo electric cylinder are two air springs, pivotal in facilitating weight distribution to effectively balance the load on the swing jib.

The rear end of the servo electric cylinder is steadfastly secured to the frame through fixed plates. The piston of the servo electric cylinder finds its position atop two clamping members through the utilization of fish-eye joints and fish-eye shafts. Furthermore, the upper extremity of each clamping member features an additional front air spring steel shaft, with both ends of this shaft being connected to the air springs. The opposing ends of these air springs are linked to the frame through rear air spring steel shafts.

Advantages of the Present Disclosure

The present disclosure boasts a multitude of advantages. It incorporates damping springs, tilt and pan damping rods, and left-right swing damping rods, collectively designed to absorb oscillatory forces occurring in diverse directions as the gimbal-mounted camera undergoes motion. This comprehensive damping configuration effectively mitigates vibrations and upholds the camera's vertical orientation. Furthermore, high-frequency vibrations are attenuated through the utilization of damping steel rings. The structure of the jib embraces a rapid abutting methodology, rendering user disassembly effortless and intuitive.

Additionally, utilizing the telescopic movement of the servo electric cylinder and the air spring, the clamping member is mobilized for pitch movement. The air spring provides supplementary assistance in equilibrium of the jib's load. This configuration ensures that the forces exerted by the servo electric cylinder during extension and contraction remain balanced, negating the necessity for counterweight blocks to balance the center of gravity, thereby enhancing user-friendliness. The diagonal positioning of the servo electric cylinder and air spring prevents the overall height of the device from being affected by the lengths of these components themselves, effectively reducing the device's overall height. Empirical findings substantiate a height reduction of up to 50 cm, effectively mitigating concerns regarding road-height obstructions.

Figure 1:
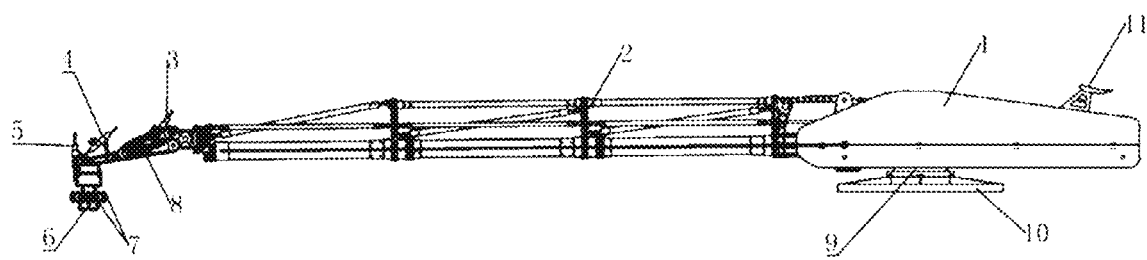
FIG. 1: Structural diagram encapsulating the overall concept of the present disclosure.

In the drawings, 1. Housing, 2. Rapid abutting structure, 3. Damping rod one, 4. Damping rod three, 5. Damping rod four, 6. Gimbal camera mounting plate, 7. Damping steel ring, 8. Damping spring, 9. Disc, 10. Base, 11. Tail fin, 12. Main jib, 13. Secondary jib, 14. Crossbar, 15. Cross brace, 16. Diagonal brace, 17. Main jib docking male connector, 18. Main jib docking female connector, 19. Tilt and pan axis damping bracket, 20. Damping jib roll axis, 21. Roll axis lower bracket, 22. Upper damping plate fixing plate, 23. Lower damping plate, 24. Upper damping plate, 25. Lower damping plate steel column, 26. Upper damping plate steel column, 27. Damping jib body, 28. Tilt and pan damping rod steel shaft two, 29. Damping rod five, 30. Tilt and pan damping rod steel shaft one, 31. Limiting damping rod steel shaft, 32. Damping jib steel shaft, 33. Damping rod two, 34. Air spring, 35. Servo electric cylinder, 36. Counterweight block, 37. Frame, 38. Motor, 39. Reducer, 40. Pinion, 41. Large gear 42. Rotary bearing, 43. Clamping member, 44. Damping jib fixed side plate, 45. Damping jib square tube side plate, 46. Positioning shaft.

DETAILED DESCRIPTION

To elucidate the purpose, technical solutions, and benefits of the present disclosure, a comprehensive explication is presented herein, coupled with accompanying illustrations and exemplifications. It is vital to recognize that the specific instances delineated below are solely aimed at elucidating the present disclosure and do not seek to confine its scope.

Figure 2:
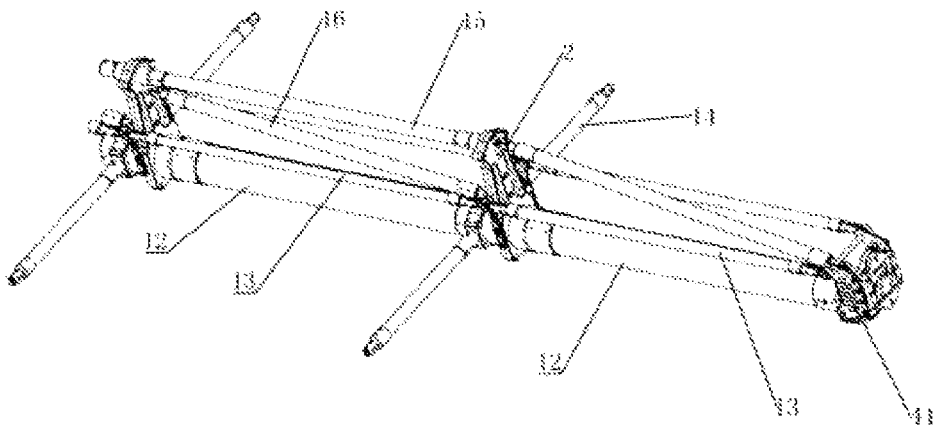
FIG. 2: Partial structural diagram focusing on the jib configuration.
Figure 3:
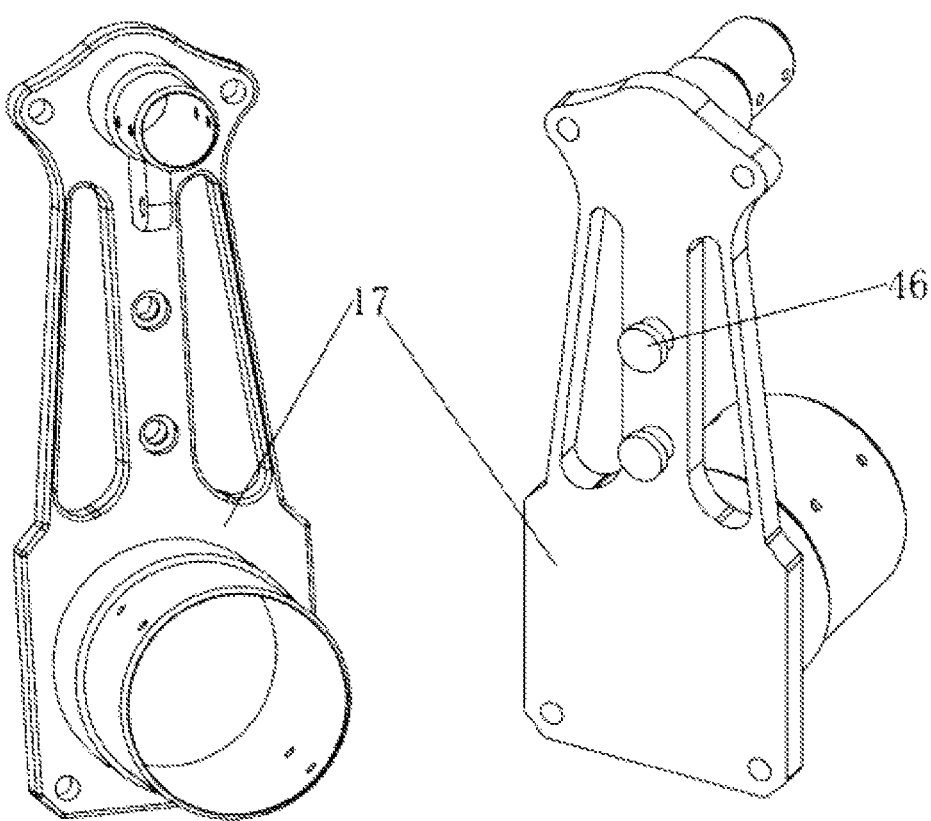
FIG. 3: Structural diagram elaborating the main jib docking male connector.
Figure 4:
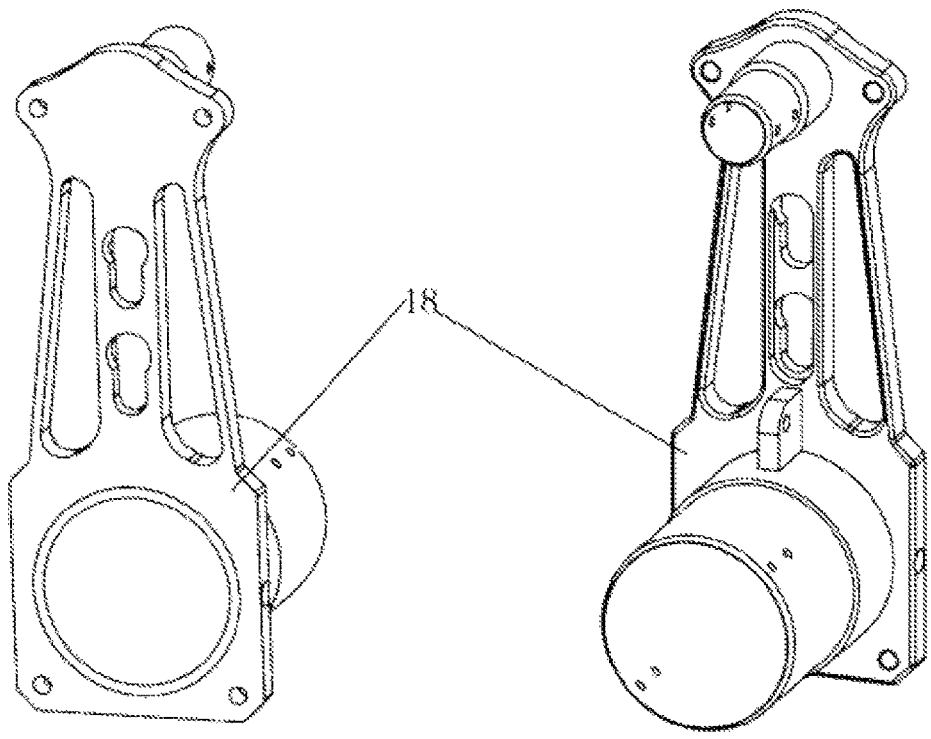
FIG. 4: Structural diagram elaborating the main jib docking female connector.
Figure 5:
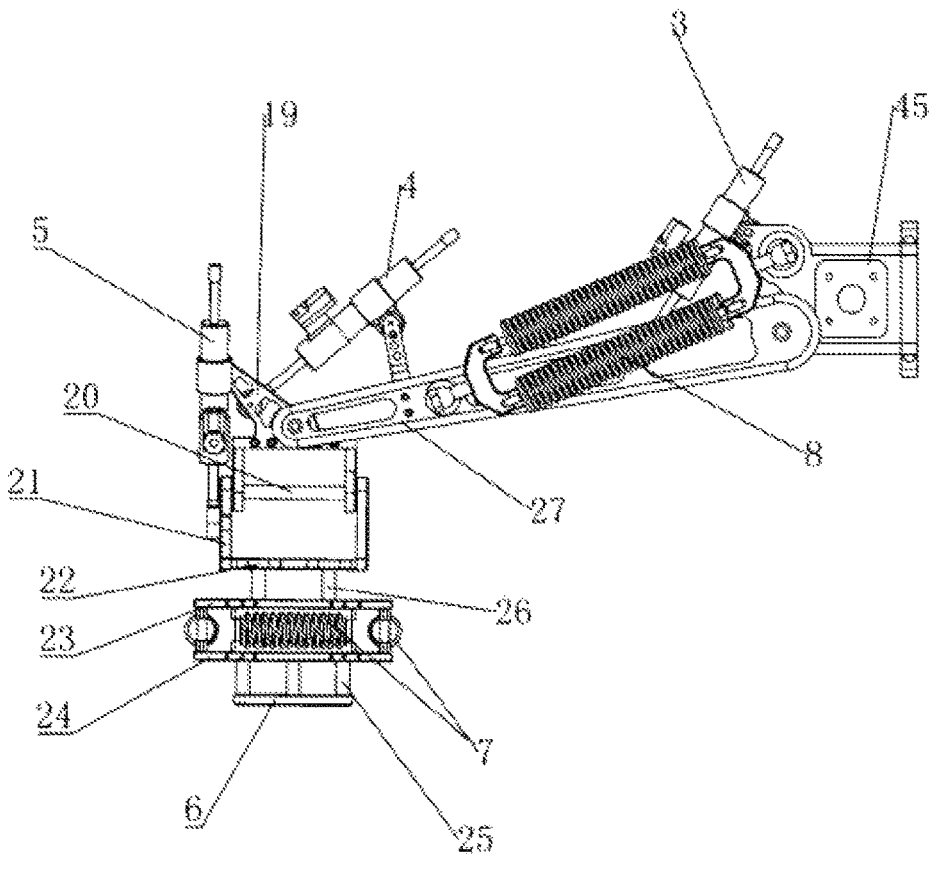
FIG. 5: Structural diagram 1 of the damping part's components.
Figures 6, 7:
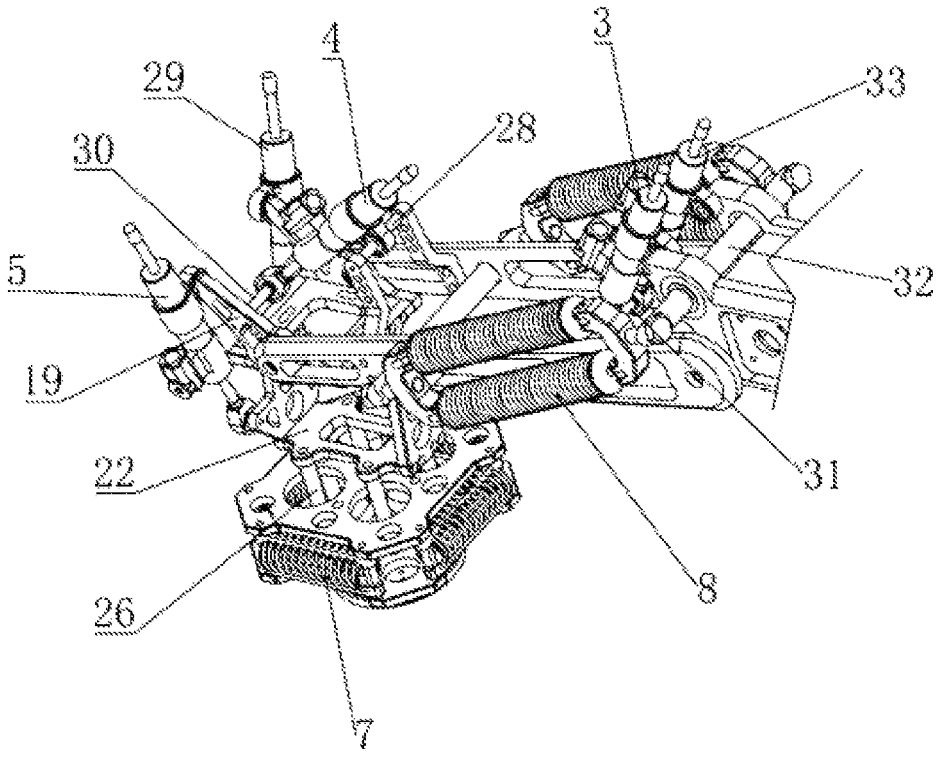
FIG. 6: Structural diagram 2 of the damping part's components.
FIG. 7: Structural diagram outlining the rotation part's components.
Figure 8:
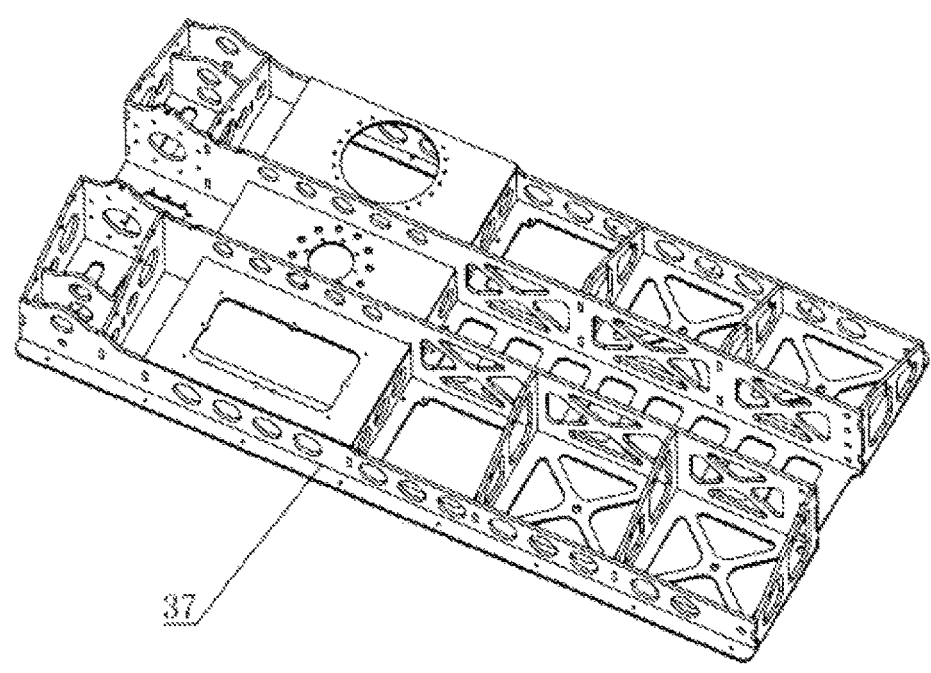
FIG. 8: Structural diagram of the frame.
Figure 9:
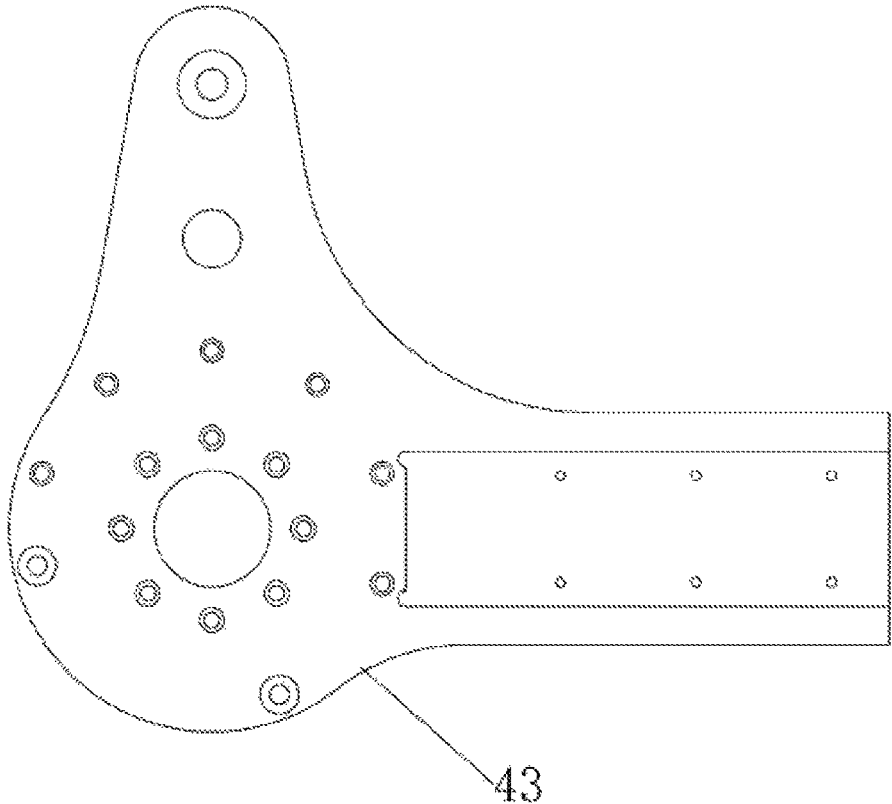
FIG. 9: Structural diagram 1 of the clamping member.
Figure 10:
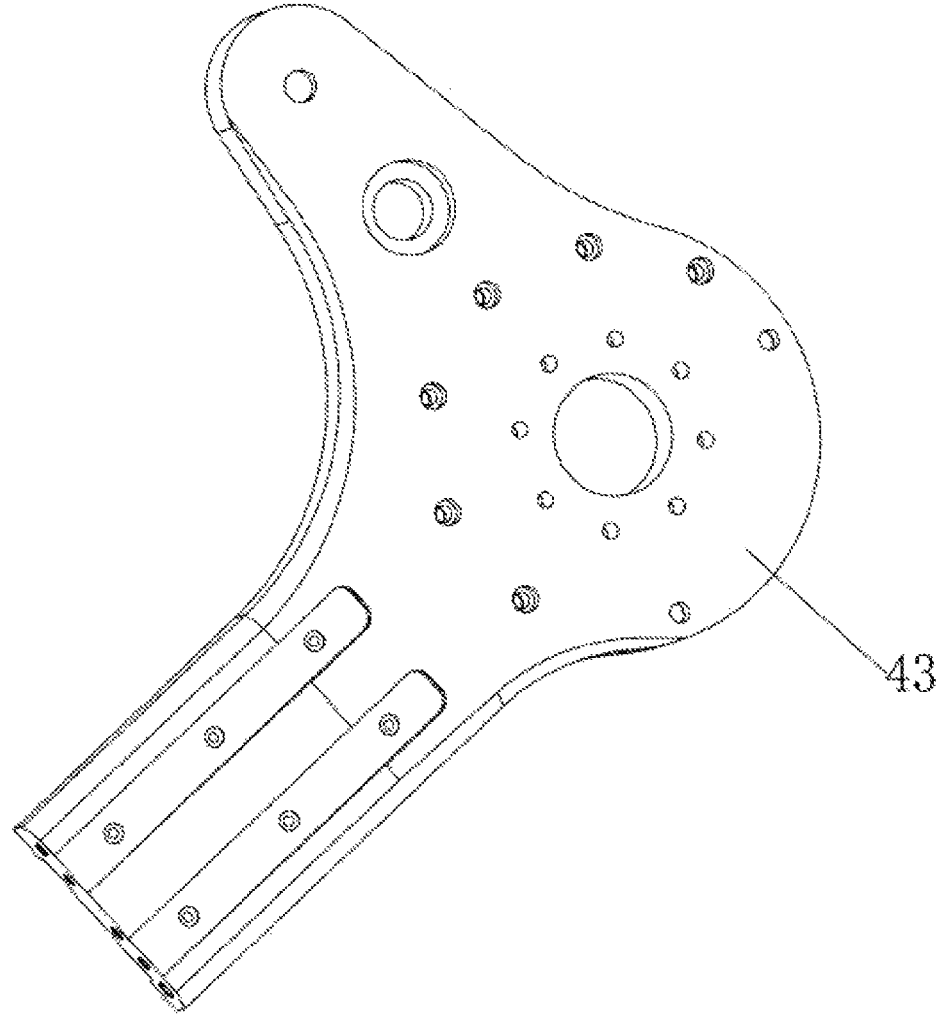
FIG. 10: Structural diagram 2 of the clamping member.
Figure 11:
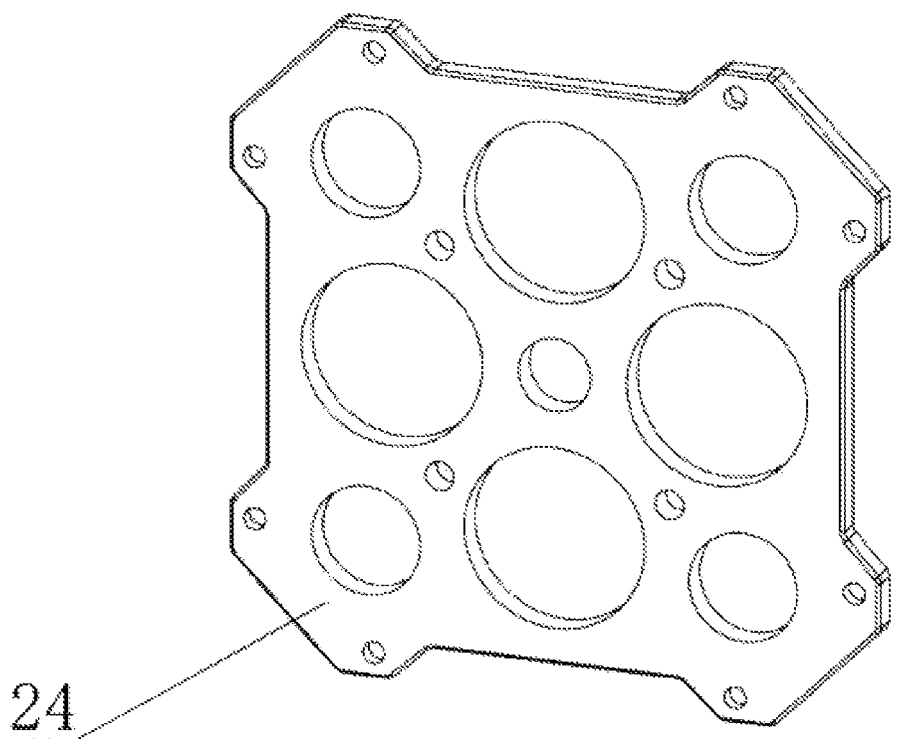
FIG. 11: Structural diagram of the upper damping plate.
Figure 12:
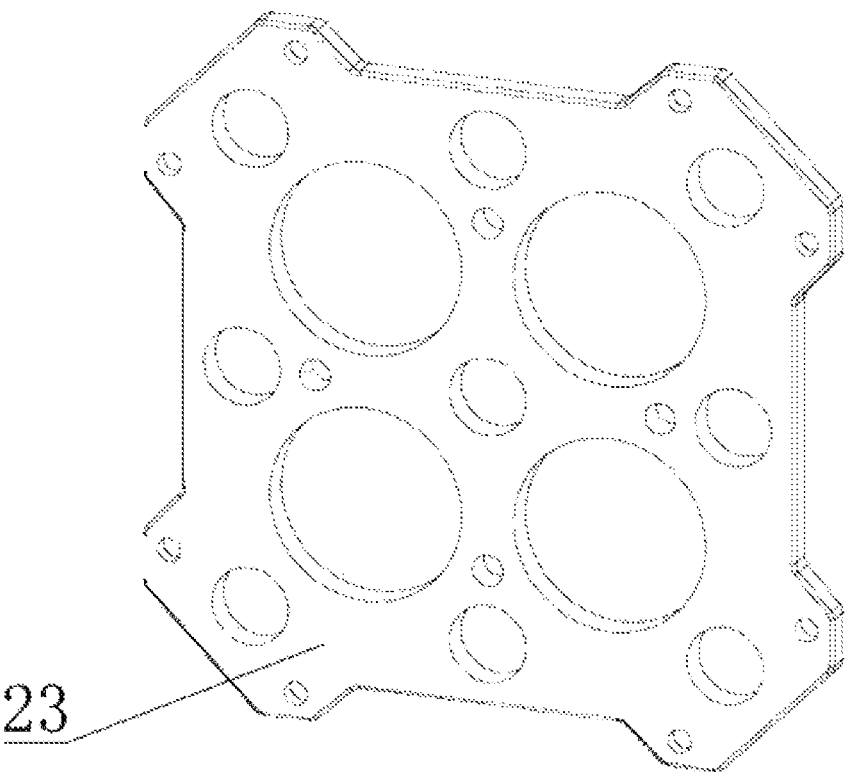
FIG. 12: Structural diagram of the lower damping plate.
Figure 13:
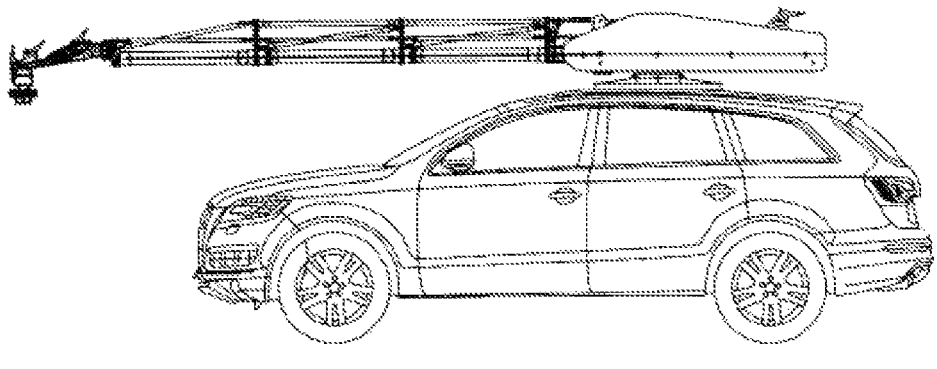
FIG. 13: Structural diagram showcasing an embodiment of the present disclosure's practical implementation.

As Depicted in FIGS. 1 to 13: The photographing system for an ultralow-height counterweight-free vehicle-mounted jib encompasses a base 10, a rotation part, an jib assembly, and a damping part. Within the rotation part, several components are included such as housing 1, frame 37, counterweight block 36, servo electric cylinder 35, motor 38, pinion 40, and large gear 41. All these constituents are strategically positioned atop the base 10. The frame 37 establishes a connection with the large gear 41 through a rotary bearing 42, with the lower extremity of the large gear 41 affixing to a disc 9 and the base plate of the rotary bearing. This arrangement ultimately connects to the base 10. Notably, the large gear 41 interlocks with the pinion 40, which, in turn, is linked to the motor 38's output shaft via a reducer 39. Housed within the frame 37 are the pinion 40 and the servo electric cylinder 35, which, in its entirety, is situated within the housing 1. The servo electric cylinder 35 finds connection to a rapid abutting structure 2 through a clamping member 43, and this rapid abutting structure 2 remains linked to the jib assembly. The jib assembly's opposite terminal is secured to a gimbal camera mounting plate 6 through a damping part, housing damping springs 8 and a versatile joint structure incorporating tilt and pan damping rods, as well as lateral swing damping rods.

The damping springs 8 are symmetrically situated in 4 pairs, with each pair positioned on the exterior surfaces of two damping jib bodies 27. Furthermore, damping rod one 3, coupled with damping rod two 33, are found on the inner aspects of these two damping jib bodies 27. Importantly, the internal terminals of tilt and pan damping rod 3 and damping rod 33 rest on a limiting damping rod steel shaft 31. This particular steel shaft is firmly fastened to the inner sides of the damping jib bodies 27. External terminals of both tilt and pan damping rod 3 and damping rod 33 are joined to the damping jib square tube side plate 45. Additionally, the inner facets of the two damping jib square tube side plates 45 establish connections to the damping jib square tube. Meanwhile, the opposing side of the damping jib square tube links to the damping jib plate fixing plate. The damping jib plate fixing plate in turn connects to the damping jib side fixing plate 44. This latter element remains interconnected with the jib assembly, with the upper corner of the damping jib square tube linking to a terminal of the damping spring fixing bracket, facilitated by a damping jib steel shaft 32. The alternative end of the damping spring fixing bracket is located on the damping jib body 27 via another damping jib steel shaft, whereas the lower corner of the damping jib square tube converges with the extremity of the damping jib body 27.

The tilt and pan damping rod is identified as damping rod three 4. The exterior of damping rod 4 is connected to an intermediate damping rod bracket via a tilt and pan damping rod steel shaft 28, while the interior is joined to a tilt and pan axis damping bracket 19 through the tilt and pan damping rod steel shaft one 30. Both the tilt and pan axis damping bracket 19 and the intermediate damping rod bracket are strategically positioned at the forefront of the damping jib body 27.

The category of left-right swing damping rods encompasses damping rod four 5 and damping rod five 29. The external portions of both damping rod four 5 and damping rod five 29 interface with the termini of the tilt and pan axis damping bracket 19. Intriguingly, the interior ends of these damping rods 5 and 29 form connections with the roll axis lower bracket 21, serving as a conduit to link with the roll axis upper bracket via the damping jib roll axis 20. Furthermore, the upper region of the roll axis upper bracket is securely fastened to the tilt and pan axis base plate, with both flanks of the tilt and pan axis base plate attaching to the lower extremity of the tilt and pan axis damping bracket 19.

The roll axis lower bracket 21 is intricately connected to the upper damping plate fixing plate 22, while the base of the upper damping plate fixing plate 22 is fastened to the upper damping plate 24 via upper damping plate steel columns 26. The upper damping plate 24 is linked to the lower damping plate 23 through damping steel rings 7, and the lower damping plate 23 is securely attached to the gimbal camera mounting plate 6 through lower damping plate steel columns 25. Employing four sets of damping steel rings 7, they are strategically positioned between the upper damping plate 24 and lower damping plate 23 along all four edges via damping steel ring arrangement.

The swing jib is fashioned by meticulously connecting two cross braces 15, three diagonal braces 16, three main jibs 12, four crossbars 14, six secondary jibs 13, and three rapid abutting structures 2 using bolts. The swing jib is divided into three segments by two rapid abutting structures 2, where two of these segments encompass a cross brace 15, a diagonal brace 16, two crossbars 14, two secondary jibs 13, and one main jib 12 each. The remaining segment, located adjacent to the damping part, consists of a diagonal brace 16, two secondary jibs 13, and one main jib 12. The cross braces 15 and diagonal braces 16 are thoughtfully situated directly above the main jib 12, while the two secondary jibs 13 symmetrically flank the main jib 12 on either side. Furthermore, the two crossbars 14 symmetrically link to the sides of the main jib 12 using steel cables.

The rapid abutting structure 2 is composed of a main jib docking male connector 17 and a main jib docking female connector 18. Each of the four corners of both the male and female connectors is equipped with corresponding threaded holes. Additionally, these connectors feature through holes in their lower regions to facilitate seamless passage of the main jib 12.

The main jib docking female connector 18 boasts two positioning shafts 46 and corresponding positioning holes. The primary role of these positioning shafts 46 is to expedite swift and accurate alignment between the two connectors—namely, the main jib docking male connector 17 and the main jib docking female connector 18—prior to their screwing together. This seamless alignment process ensures rapid and precise screwing without the need for manual alignment of the screw holes. Moreover, this innovative design serves as a protective measure, preventing detachment even if the screws become loose and thereby ensuring that the jib remains firmly secured in its intended position.

The servo electric cylinder 35 is firmly fixed to the frame 37 at its rear end via fixing plates. The piston of the servo electric cylinder 35 is positioned upon two clamping members 43, facilitated through fish-eye joints and fish-eye shafts. Each clamping member 43's upper extremity is also equipped with a front air spring steel shaft, with both terminals of this shaft linking to an air spring 34. The alternate end of the air spring 34 is tethered to the frame 37 through a rear air spring steel shaft. Four clusters of counterweight blocks 36 find placement on the rear side of the frame 37. Notably, these counterweight blocks are designed to hjibonize the overall center of gravity in circumstances when the system is not affixed to a vehicle, their relevance diminishes when utilized within a vehicle setting. Two air springs 34 are symmetrically dispersed on either side of the servo electric cylinder 35, constituting tension-type air springs 34. These air springs 34 assume the role of providing equilibrium to counterbalance the weight sustained by the damping jib body's front end. This equilibrium assures that the forces generated during the servo electric cylinder 35's elongation and contraction remain hjibonious. This pivotal design aspect obviates the necessity for counterweight blocks, thereby augmenting user convenience.

The lower terminals of the two clamping members 43 are both anchored to the frame 37 through rotary bearings, allowing for the complete rotation of the clamping member 43 around these bearings.

Damping Part Operations:

The damping part plays a pivotal role, manifesting three distinct functions:

1. The four lateral damping springs (8) counteract vertical oscillations. By adjusting the screws on both flanks, the tension of these springs can be tailored to accommodate various loads, endowing mechanical stability to vertical oscillations and stabilizing the vertical axis.

2. The tilt and pan damping rods, alongside damping rod three 4, absorb forward and backward swinging forces. Damping rod 5 and damping rod 29 subdue lateral oscillations, lending buffering assistance during vehicular turns. Their collective interplay forms a universal joint structure, ensuring the gimbal-mounted camera affixed to the jib's lower extremity remains consistently vertical during pitch movement.

3. Employed for high-frequency vibration filtration, the damping steel rings 7 contribute to enhanced visual quality.

Rotation Part Mechanism: The rotation segment is characterized by the motor 38 orchestrating the initial phase of rotation through the reducer 39 (first-level deceleration) and subsequently via the pinion 40 (second-level deceleration). The pinion 40 establishes meshing contact with the large gear 41, precipitating synchronized rotation of the frame 37 and housing 1 in tandem with the large gear 41.

The jib's connection relies on a rapid detachment strategy, facilitated by four screws and facilitated through a primary jib docking male connector 17 and a main jib docking female connector 18.

The amalgamation of cross braces 15, diagonal braces 16, and the rapid abutting structure 2 collectively forges a robust triangular framework, effectively buttressing the system. In parallel, the quadrilateral formation constituted by the small jibs 13, rapid abutting structure 2, damping jib fixed side plate 44, and main jib 12 guarantees the jib's front remains in a vertical orientation during vertical motion.

The inclusion of counterweight blocks 36 strategically shifts the device's center of gravity upward, not only enhancing safety but also averting concerns regarding vibrations stemming from front-heavy jibs traversing uneven roads. This strategic balance permits detachment of the jib for ground-level usage, bypassing the need for base fixation and thwarting potential tilting, thereby broadening its scope of application.

Remarkably, the jib structure does away with the necessity for counterweights, harnessing the servo electric cylinder 35 to deliver tilt and pan axis movements. Augmenting this, the tension-type air springs 34 alleviate the load borne by the servo electric cylinder, negating the prerequisite of counterweights to stabilize the main jib 12.

The jib configuration features an expedited detachment methodology, streamlining the disassembly process.

An impressive achievement, the overall height has been condensed to under 50 cm, ensuring compliance with road regulations concerning height restrictions. This structural optimization is accompanied by a streamlined housing design, orchestrating diminished air resistance, noise pollution, and fuel consumption.

The housing 1 is distinguished by a tail fin 11 located at its rear, leveraging airflow for downward pressure generation. This mechanism contributes to elevating rear gravity and fostering overall balance of the center of gravity.

During operation, a gimbal-mounted camera is mounted on the gimbal camera mounting plate 6. The initiation of rotation is executed by activating the motor 38. The motor's output shaft propels the pinion 40 into rotation through the reducer 39. Subsequent meshing of the pinion 40 and the large gear 41 impels synchronized rotation of the frame 37 and housing 1 along the large gear 41. The clamping members 43, intrinsically linked to the frame 37, which drives the clamping member 73 to rotate, with main jib 12, small jibs 13, cross braces 15, and diagonal braces 16 connecting to the clamping members 43, channel motion into the jib's rotation, thereby driving the gimbal-mounted camera's trajectory on the other end via the damping part. For pitch motion, the servo electric cylinder 35 extends its piston to prompt rotation of the clamping members 43 via fish-eye joints and shafts. This rotational effect propels the main jib 12, small jibs 13, cross braces 15, and diagonal braces 16 to execute pitch motion, ultimately translated through the damping part to the gimbal-mounted camera's pitch adjustment.

The above-stated elucidation underscores representative embodiments of the present disclosure and does not aim to confine its domain. Pertinent modifications, equivalent substitutions, or enhancements, compliant with the essence and tenets of the present disclosure, warrant inclusion within the protective ambit of the present disclosure.

The invention claimed is:

1. An ultralow-height vehicle-mounted jib, comprising:
   a base;
   a housing on the base;
   a frame, a counterweight block, a servo electric cylinder, a motor, a pinion, and a gear in the housing;
   a jib assembly comprising at least one rapid abutting structure; and
   a damping part;
   wherein the servo electric cylinder is connected to a first end of the jib assembly via a clamping member, wherein two air springs are symmetrically arranged on both sides of the servo electric cylinder;
   wherein a gimbal camera mounting plate is connected to a second end of the jib assembly through the damping part;
   wherein the damping part comprises at least one damping spring, at least one tilt and pan damping rod, and at least one lateral swing damping rod; and
   wherein at least one air spring of the two air springs is positioned between the frame and the clamping member, with a first end of the air spring connected to the clamping member and a second end connected to the frame.

2. The ultralow-height vehicle-mounted jib of claim 1, wherein the frame is coupled to the gear via a rotary bearing, the gear connects to a rotary bearing base plate through a disc, and the rotary bearing base plate is secured to the base, and
   the gear engages with the pinion, and the pinion is linked to an output shaft of the motor via a reducer, both the pinion and the servo electric cylinder are situated within the frame, which is located within the housing.

3. The ultralow-height vehicle-mounted jib of claim 2, wherein the at least one damping spring comprise a plurality of damping springs arranged in pairs on the outer sides of a plurality of damping jib bodies;

further comprising:

a plurality of tilt and pan damping rods positioned on the inner sides of the plurality of damping jib bodies, the plurality of tilt and pan damping rods comprising a first damping rod and a second damping rod;

a first end of the first damping rod and a first end of the second damping rod being attach to a limiting damping rod steel shaft, which is fixed to the inner sides of the plurality of damping jib bodies;

a second end of first damping rod and a second end of the second damping rod being linked to a plurality of damping jib square tube side plates;

the inner sides of the damping jib square tube side plates being connected to damping jib square tubes, and the opposite side of these damping jib square tubes connects to damping jib fixed plates;

the damping jib fixed plates are connected to damping jib fixed side plates;

an upper corner of the damping jib square tube side plates being connected to a first end of a damping spring fixed bracket through a first damping jib steel shaft, and a second end of the damping spring fixed bracket being attached to the plurality of damping jib bodies via a second damping jib steel shaft; and a lower corner of the damping jib square tube side plates is linked to an end of the plurality of damping jib bodies.

4. The ultralow-height vehicle-mounted jib of claim 3, wherein the plurality of tilt and pan damping rods further comprise a third damping rod, an outer end of the third damping rod connects to an intermediate damping rod support through a first tilt and pan damping rod steel shaft, and an inner end of the third damping rod links to a tilt and pan axis damping bracket via a second tilt and pan damping rod steel shaft, both the tilt and pan axis damping bracket and the intermediate damping rod support are situated at the front end of the plurality of damping jib bodies.

5. The ultralow-height vehicle-mounted jib of claim 4, wherein the at least one lateral swing damping rod comprises a fourth damping rod and a fifth damping rod, outer ends of the fourth damping rod and the fifth damping rod attach to the ends of the tilt and pan axis damping bracket, inner ends of the fourth damping rod and the fifth damping rod connect to a roll axis lower bracket;

wherein the roll axis lower bracket links to a roll axis upper bracket through a damping jib roll axis; and wherein the upper part of the roll axis upper bracket attaches to a tilt and pan axis base plate, with both sides of the tilt and pan axis base plate connected to the lower edge of the tilt and pan axis damping bracket.

6. The ultralow-height vehicle-mounted jib of claim 5, wherein the roll axis lower bracket connects to an upper damping plate fixing plate, the bottom of the upper damping plate fixing plate connect to an upper damping plate via upper damping plate steel columns, and the upper damping plate is linked to a lower damping plate via damping steel rings, and the lower damping plate is attached to the gimbal camera mounting plate through lower damping plate steel columns.

7. The ultralow-height vehicle-mounted jib of claim 1, wherein the jib assembly comprises cross braces, diagonal braces, main jibs, crossbars, secondary jibs, and rapid abutting structures including the at least one rapid abutting structure, and the rapid abutting structures are fastened together with bolts;

wherein the jib assembly comprises three sections divided by two of the rapid abutting structures, with the cross braces and diagonal braces positioned directly above the main jibs; and wherein two of the secondary jibs are situated on both sides above the main jibs, and two of the crossbars are symmetrically situated on the sides of the main jibs and are coupled to steel wires.

8. The ultralow-height vehicle-mounted jib of claim 7, wherein each of the rapid abutting structures comprises a main jib docking male connector and a main jib docking female connector; and wherein corresponding threaded holes are present on four corners of both the main jib docking male connector and the main jib docking female connector, and a through-hole for a corresponding one of the main jibs to pass through is located on the bottom part of both the main jib docking male connector and the main jib docking female connector.

9. The ultralow-height vehicle-mounted jib of claim 1, wherein the rear end of the servo electric cylinder is fixed onto the frame using a fixing plate;

wherein a piston of the servo electric cylinder is positioned on two clamping members via fish-eye joints and fish-eye shafts;

wherein an upper end of the two clamping members is equipped with an air spring front steel shaft, both ends of which are linked to the two air springs; and wherein the other end of the two air springs attach to the frame through an air spring rear steel shaft, and four sets of counterweight blocks are placed on the rear side of the frame.

* * * * *